United States Patent [19]

Itoh et al.

[11] Patent Number: 4,473,511

[45] Date of Patent: Sep. 25, 1984

[54] VARIABLE VENTURI-TYPE CARBURETOR

[75] Inventors: Takaaki Itoh; Takashi Katou, both of Mishima; Toshiharu Morino, Mie, all of Japan

[73] Assignees: Toyota Jidosha Kabushiki Kaisha, Toyota; Aisan Industry Co., Ltd., Obu, both of Japan

[21] Appl. No.: 506,998

[22] Filed: Jun. 23, 1983

[30] Foreign Application Priority Data

Dec. 20, 1982 [JP] Japan .............................. 57-222083
Dec. 20, 1982 [JP] Japan .............................. 57-222081

[51] Int. Cl.³ ............................................ F02M 9/06
[52] U.S. Cl. .................................. 261/44 C; 208/201
[58] Field of Search .............. 261/44 C; 208/6 A, 201

[56] References Cited

U.S. PATENT DOCUMENTS 2,286,422  6/1942  Katcher ............................... 308/201
2,601,478  6/1952  Weir ..................................... 308/6 A
3,003,830  10/1961  Blazek et al. ....................... 308/201
3,469,894  9/1969  Stamm ................................. 308/201

FOREIGN PATENT DOCUMENTS 54-50728  4/1979  Japan ............................... 261/44 C
1394306  5/1975  United Kingdom .............. 261/44 C Primary Examiner—Tim R. Miles
Attorney, Agent, or Firm—Finnegan, Henderson, Farabow, Garrett & Dunner

[57] ABSTRACT

A variable venturi-type carburetor comprising a hollow cylindrical casing and a suction piston which is movable in the casing. The casing has a support pipe extending along the axis of the suction piston. The suction piston has a piston rod which is inserted into the support pipe. A bearing sleeve, equipped with a plurality of balls, is inserted between the piston rod and the support pipe. The bearing sleeve has a plurality of connecting grooves formed on the outer circumferential wall of the sleeve and extending in the axial direction of the sleeve over the entire length thereof.

13 Claims, 11 Drawing Figures

VARIABLE VENTURI-TYPE CARBURETOR

BACKGROUND OF THE INVENTION

The present invention relates to a variable venturi-type carburetor.

A variable venturi-type carburetor has been proposed in which a suction piston is slidably inserted into the casing of the carburetor and in which the interior of the casing of the carburetor is divided into an atmospheric pressure chamber and a vacuum chamber by the suction piston. The suction piston comprises a metering needle fixed onto the tip face thereof and a piston rod extending in a direction opposite to the extending direction of the metering needle. A hollow cylindrical support pipe, surrounding the piston rod, is fixed onto the casing of the carburetor, and the piston rod is supported by a linear ball bearing. This linear ball bearing comprises a plurality of aligned ball rows each extending in the axial direction of the piston rod and has such a construction that each of the balls is circulated in the support pipe. Therefore, the construction of the linear ball bearing is complicated, and when such a linear ball bearing is used, the cost of manufacturing the carburetor is disadvantageously increased.

An inexpensive bearing having the same function as that of the linear ball bearing is known in other industrial fields. As is illustrated in FIG. 10, this bearing comprises a hollow cylindrical sleeve a and a plurality of balls b and, thus, has a simple construction. Consequently, if this bearing is used, it is possible to reduce the cost of manufacturing the carburetor. However, if this bearing is used in the variable venturi-type carburetor illustrated in FIG. 10, a problem occurs in that the bearing moves towards the left in FIG. 10 due to a pressure difference between the vacuum in a vacuum chamber c and the vacuum in an interior chamber d. That is, if the engine speed is increased, the level of the vacuum in the interior chamber d becomes greater than that of the vacuum in the vacuum chamber c, and, as a result, the bearing moves towards the left in FIG. 10. FIG. 11 illustrates the relationship, obtained in the experiments, between the engine speed N and a pressure difference $\Delta P$ which occurs between the vacuum in the vacuum chamber c and the vacuum in the interior chamber d. From FIG. 11, it will be understood that the pressure difference $\Delta P$ is increased in accordance with an increase in the engine speed N. At the present stage, the reason why the pressure difference $\Delta P$ occurs is unclear.

When the pressure difference $\Delta P$ occurs, the bearing moves towards the left in FIG. 10, as mentioned above, and thus abuts against a snap ring e. However, if the bearing abuts against the snap ring e when the suction piston f moves towards the left in FIG. 10, the bearing is caused to move towards the right in FIG. 10 together with the suction piston f and thus the balls b do not rotate. As a result, since there is a delay in the movement of the suction piston f, a problem occurs in that the responsiveness of the suction piston to a change in the operating condition of the engine deteriorates. In addition, another problem occurs in that wearing of the balls is promoted.

SUMMARY OF THE INVENTION

An object of the present invention is to provide a variable venturi-type carburetor in which the responsiveness of the suction piston to a change in the operating condition of the engine is improved and in which the suction piston moves smoothly.

According to the present invention, there is provided a variable venturi-type carburetor comprising: an intake passage formed in the carburetor; an axially extending hollow cylindrical casing having an interior chamber therein; an axially extending suction piston movable in the casing in an axial direction thereof and dividing the interior chamber into a vacuum chamber and an atmospheric pressure chamber, the suction piston having a tip face capable of projecting into the intake passage and defining a venturi in the intake passage; a needle fixed onto the tip face and extending along the axis of the suction piston; a support pipe fixed onto the casing and extending in the interior chamber along the axis of the casing, the support pipe having a cylindrical inner circumferential wall; a piston rod fixed onto the suction piston and extending along the axis of the suction piston in a direction which is opposite to the extending direction of the needle, the piston rod being inserted into the support pipe and having a cylindrical outer circumferential wall which has a diameter smaller than that of the inner circumferential wall of the support pipe; a hollow cylindrical bearing sleeve movably inserted between the inner circumferential wall of the support pipe and the outer circumferential wall of the piston rod and having opposed end faces and ball insertion bores which are formed on the outer circumferential wall of the sleeve near the opposed end faces and which are equidistantly arranged in the circumferential direction of the outer circumferential wall of the sleeve; a connecting passage formed in the sleeve and interconnecting the opposed end faces to each other; and balls rotatably inserted into the corresponding ball insertion bores and continuously contacting both the inner circumferential wall of the support pipe and the outer circumferential wall of the piston rod, each of the balls slightly projecting outwardly from the outer circumferential wall of the sleeve and inwardly from the inner circumferential wall of the sleeve.

The present invention will be more clearly understood from the description of the preferred embodiments set forth below, with reference made to the accompanying drawings.

DESCRIPTION OF THE PREFERRED EMBODIMENTS

Figure 1:
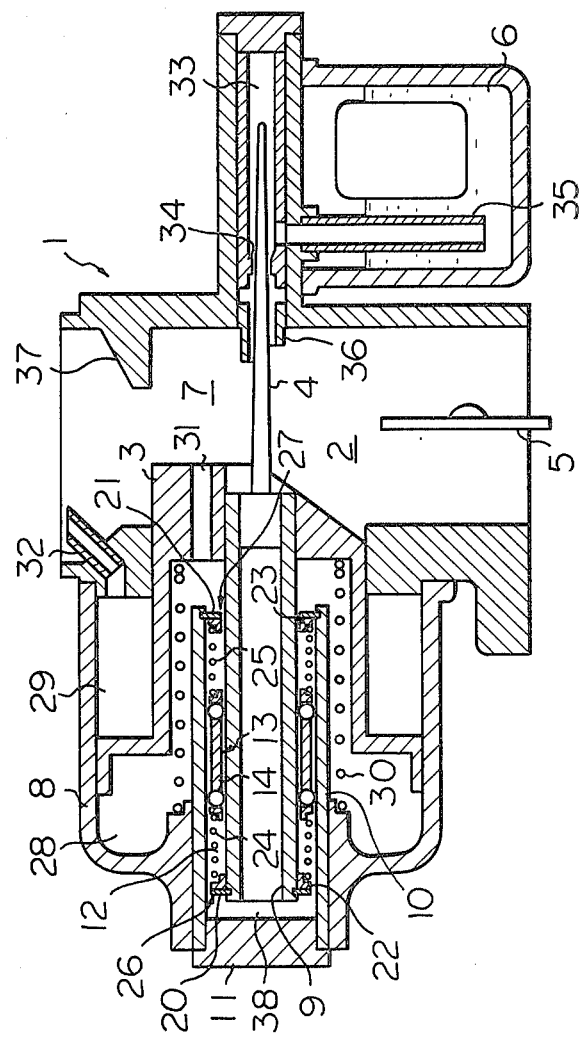
FIG. 1 is a cross-sectional side view of a variable venturi-type carburetor according to the present invention.

Referring to FIG. 1, reference numeral 1 designates a carburetor body, 2 a vertically extending intake passage, 3 a suction piston transversely movable in the intake passage 2, 4 a needle fixed onto the tip face of the suction piston 3, 5 a throttle valve arranged in the intake passage 2 downstream of the suction piston 3, and 6 a float chamber of the carburetor. A venturi 7 is formed between the tip face of the suction piston 3 and the inner wall of the intake passage 2. A hollow cylindrical casing 8 is fixed onto the carburetor body 1, and the suction piston 3 is slidably inserted into the casing 8. The suction piston 3 has a hollow cylindrical piston rod 9 extending in a direction opposite to the extending direction of the needle 4, and a support pipe 10, surrounding the piston rod 9, is fixed onto the casing 8. As is illustrated in FIG. 1, the support pipe 10 is formed by a hollow cylindrical member having an inner diameter which is larger than the outer diameter of the piston rod 9, and the outer end of the support pipe 10 is covered by a blind cap 11. The piston rod 9 is arranged coaxially with the support pipe 10, and a bearing 13 is inserted into an annular gap 12 formed between the piston rod 9 and the support pipe 10.

Figure 4:
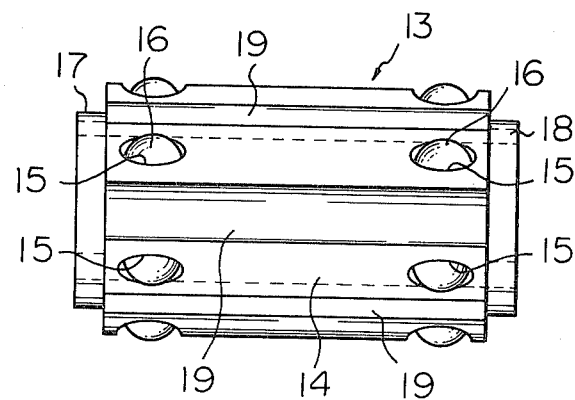
FIG. 4 is a side view of an embodiment of a bearing according to the present invention.
Figure 5:
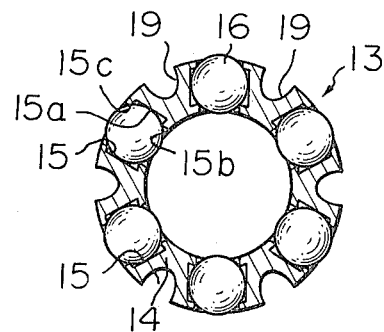
FIG. 5 is a cross-sectional view of FIG. 4.

As is illustrated in FIGS. 4 and 5, the bearing 13 comprises a substantially cylindrical hollow sleeve 14 made of a synthetic resin such as a polyamide or a polyacetal. A plurality of ball insertion bores 15 is formed on the outer circumferential wall of the sleeve 14 near the opposed end faces thereof and is equidistantly arranged along the outer circumferential wall of the sleeve 14. Each of the ball insertion bores 15 comprises an increased diameter portion 15a at the central portion thereof, a reduced diameter portion 15b on the inner wall thereof, and a reduced diameter portion 15c on the outer wall thereof. Balls 16 are inserted into the corresponding increased diameter portions 15a through the reduced diameter portions 15c. The increased diameter portions 15a have a diameter which is slightly larger than that of the balls 16, and the reduced diameter portions 15c have a diameter which is slightly smaller than that of the balls 16 and slightly larger than that of the reduced diameter portions 15b. When the balls 16 are inserted into the ball insertion bores 15, the balls 16 slightly project outwardly from the outer circumferential wall of the sleeve 14 and inwardly from the inner circumferential wall of the sleeve 14. The balls 16 are able to rotate in the ball insertion bores 15.

Annular ribs 17 and 18 are formed in one piece on the opposed end faces of the sleeve 14, and a plurality of connecting grooves 19 is formed on the outer circumferential wall of the sleeve 14. Each of the connecting grooves 19 extends in the axial direction of the sleeve 14 over the entire length of the outer circumferential wall of the sleeve 14 between the adjacent balls 16.

Figure 2:
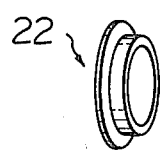
FIG. 2 is a perspective view of a snap ring.
Figure 3:
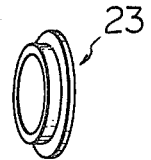
FIG. 3 is a perspective view of a snap ring.

As is illustrated in FIG. 1, a snap ring 20 is fitted into a ring groove formed on the outer end portion of the outer circumferential wall of the piston rod 9, and another snap ring 21 is fitted into a ring groove formed on the inner end portion of the inner circumferential wall of the support pipe 10. An annular spring retainer 22, having an L-shaped cross section, as is illustrated in FIGS. 1 and 2, is inserted into the piston rod 9 and is located adjacent to and on the inner side of the snap ring 20. Another annular spring retainer 23 having an L-shaped cross section, as is illustrated in FIGS. 1 and 3, is inserted into the support pipe 10 and is located adjacent to and on the inner side of the snap ring 21. A compression spring 24 is interposed between the spring retainer 22 and one of the end faces of the sleeve 14, and a compression spring 25 is interposed between the spring retainer 23 and the other end face of the sleeve 14. The compression springs 24 and 25 serve to maintain the bearing 13 in a central position between the snap rings 20 and 21. An annular gap 26, through which air is able to freely pass, is formed between the outer periphery of the spring retainer 22 and the inner circumferential wall of the support pipe 10, and an annular gap 27, through which air is able to freely pass, is formed between the inner periphery of the spring retainer 23 and the outer circumferential wall of the piston rod 9. If the suction piston 3 moves, the balls 16 rotate. At this time, the bearing 13 moves in the moving direction of the suction piston 3 at a speed which is one half of the moving speed of the suction piston 3.

The interior of the casing 8 is divided into a vacuum chamber 28 and an atmospheric pressure chamber 29 by the suction piston 3, and a compression spring 30 for continuously biasing the suction piston 3 towards the venturi 7 is inserted into the vacuum chamber 28. The vacuum chamber 28 is connected to the venturi 7 via a suction hole 31 formed in the suction piston 3, and the atmospheric pressure chamber 29 is connected to the intake passage 2 upstream of the suction piston 3 via an air vent 32.

A fuel passage 33 is formed in the carburetor body 1 and extends in the axial direction of the needle 4 so that the needle 4 can enter into the fuel passage 33. A metering jet 34 is arranged in the fuel passage 33. The fuel passage 33, located upstream of the metering jet 34, is connected to the float chamber 6 via a downwardly-extending fuel pipe 35, and fuel in the float chamber 6 is fed into the fuel passage 33 via the fuel pipe 35. In addition, a hollow cylindrical nozzle 36, arranged coaxially to the fuel passage 33, is fixed onto the inner wall of the intake passage 2. The needle 4 extends through the interior of the nozzle 36 and the metering jet 34, and fuel is fed into the intake passage 2 from the nozzle 36 after it is metered via an annular gap formed between the needle 4 and the metering jet 34.

As is illustrated in FIG. 1, a raised wall 37, projecting horizontally into the intake passage 2, is formed on the inner wall of the intake passage 2 above the nozzle 36, and flow control is effected between the raised wall 37 and the tip end portion of the suction piston 3. When the engine is started, air flows downwards within the intake passage 2. At this time, since airflow is restricted between the suction piston 3 and the raised wall 37, a vacuum is created in the venturi 7. This vacuum acts on the vacuum chamber 28 via the suction hole 31. The suction piston 3 moves so that the pressure difference between the vacuum in the vacuum chamber 28 and the pressure in the atmospheric pressure chamber 29 becomes approximately equal to a fixed value determined by the spring force of the compression spring 30, that is, the level of the vacuum created in the venturi 7 remains approximately constant.

Figure 10:
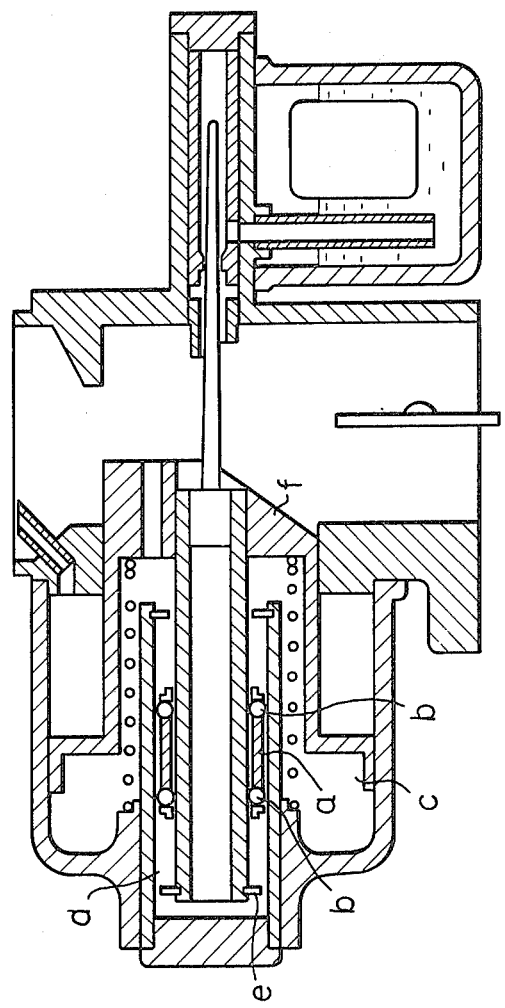
FIG. 10 is a cross-sectional side view of a carburetor illustrating the disadvantages eliminated by the present invention.
Figure 11:
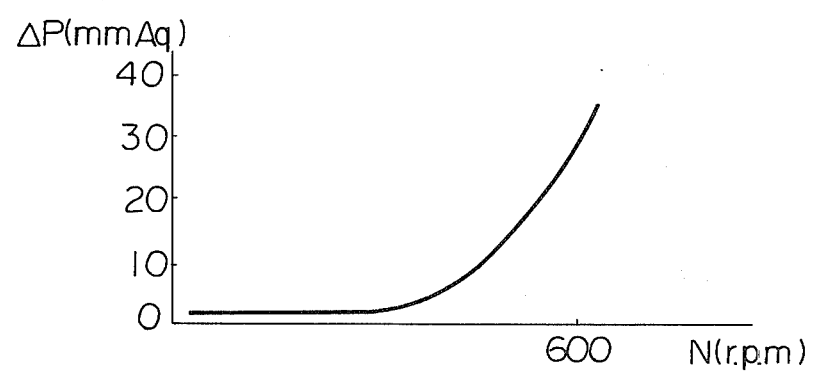
FIG. 11 is a diagram illustrating a change in vacuum.

As was previously mentioned, in the carburetor illustrated in FIG. 10, when the engine speed is increased, the level of vacuum in the interior chamber d becomes greater than that of the vacuum in the vacuum chamber c. However, in the carburetor illustrated in FIG. 1, since a plurality of connecting grooves 19 is formed on the outer circumferential wall of the sleeve 14, air in the vacuum chamber 28 is able to freely flow into an interior chamber 38, and, thus, the level of the vacuum in the interior chamber 38 is continuously equal to the level of the vacuum in the vacuum chamber 28. As a result, since the bearing 13 is continuously maintained in a central position between the snap rings 20 and 21, it is possible to obtain smooth movement of the suction piston 3.

Figure 6:
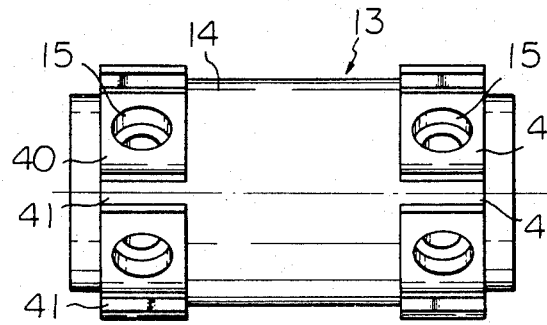
FIG. 6 is a side view of another embodiment according to the present invention.
Figure 7:
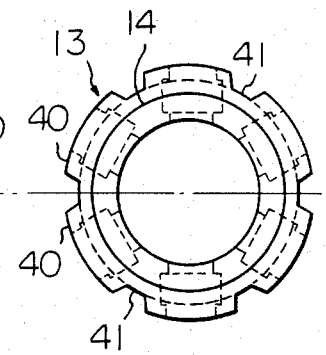
FIG. 7 is a side view of FIG. 6.

FIGS. 6 and 7 illustrate another embodiment of the bearing 13. In this embodiment, annular raised portions 40 are formed on the outer circumferential wall of the sleeve 14 at the opposed ends of the sleeve 14, respectively, and a plurality of ball insertion bores 15 is formed on the outer circumferential walls of the annular raised portions 40. In addition, a plurality of connecting grooves 41, each groove extending in the axial direction of the sleeve 14 over the entire length of the outer circumferential walls of the annular raised portions 40, is formed on the outer circumferential walls of the annular raised portions 40.

Figure 8:
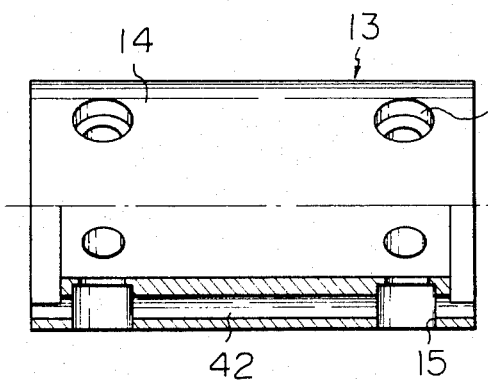
FIG. 8 is a partial cross-sectional side view of a further embodiment of a bearing according to the present invention.
Figure 9:
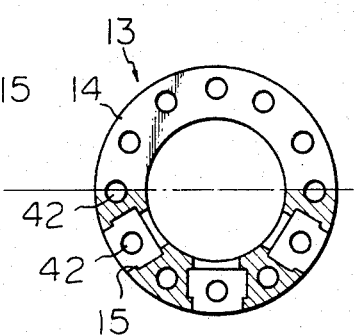
FIG. 9 is a partial cross-sectional side view of FIG. 8.

FIGS. 8 and 9 illustrate a further embodiment of the bearing 13. In this embodiment, a plurality of connecting bores 42, each extending through the sleeve 14 in the axial direction thereof, is formed in the sleeve 14. Since the connecting grooves 41 (FIGS. 6 and 7) and the connecting bores 42 have the same function so that of the connecting grooves 19 illustrated in FIGS. 4 and 5, a description there of is omitted here.

According to the present invention, it is possible to obtain smooth movement of the suction piston and a good responsiveness of the suction piston to a change in the operating condition of the engine by using an inexpensive bearing. Consequently, it is possible to reduce the cast of manufacturing the carburetor. In addition, in a conventional bearing, the sleeve of the bearing is made of a metallic material. However, if the sleeve of the bearing is made of a metallic material, when the sleeve is inserted into the piston rod, the balls are dislodged from the ball insertion bores, and, thus, a problem occurs in that it is difficult to assemble the bearing on the piston rod. However, in the present invention, when the balls 16 are inserted into the increased diameter portions 15a through the reduced diameter portions 15c, the balls 16 are retained in the increased diameter portions 15a by the reduced diameter portions 15b and 15c and thus are not dislodged from the ball insertion bores 15. Therefore, in the present invention, it is possible to easily assemble the bearing 13 on the piston rod 9.

While the invention has been described with reference to specific embodiments chosen for purposes of illustration, it should be apparent that numerous modifications could be made thereto by those skilled in the art without departing from the basic concept and scope of the invention.

We claim:

1. A variable venturi-type carburetor comprising:
   an intake passage formed in the carburetor;
   an axially extending hollow cylindrical casing having an interior chamber therein;
   an axially extending suction piston movable in said casing in axial direction thereof and dividing said interior chamber into a vacuum chamber and an atmospheric pressure chamber, said suction piston having a tip face which is capable of projecting into said intake passage and which defines a venturi in said intake passage;
   a needle fixed onto said tip face and extending along the axis of said suction piston;
   a support pipe fixed onto said casing and extending in said interior chamber along the axis of said casing, said support pipe having a cylindrical inner circumferential wall;
   a piston rod fixed onto said suction piston and extending along the axis of said suction piston in a direction which is opposite to the extending direction of said needle, said piston rod being inserted into said support pipe and having a cylindrical outer circumferential wall which has a diameter smaller than that of the inner circumferential wall of said support pipe;
   a hollow cylindrical bearing sleeve movably inserted between the inner circumferential wall of said support pipe and the outer circumferential wall of said piston rod and having opposed end faces and ball insertion bores which are formed on an outer circumferential wall of said sleeve near said opposed end faces and which are equidistantly arranged in the circumferential direction of the outer circumferential wall of said sleeve;
   a connecting passage formed in said sleeve and interconnecting said opposed end faces to each other; and
   balls rotatably inserted into said corresponding ball insertion bores and continuously contacting both the inner circumferential wall of said support pipe and the outer circumferential wall of said piston rod, each of said balls slightly projecting outwardly from the outer circumferential wall of said sleeve and inwardly from the inner circumferential wall of said sleeve.

2. A variable venturi-type carburetor according to claim 1, wherein said sleeve is made of a synthetic resin.

3. A variable venturi-type carburetor according to claim 1, wherein said carburetor comprises spring means for continuously biasing said sleeve so as to maintain said sleeve in a predetermined position.

4. A variable venturi-type carburetor according to claim 3, wherein said support pipe has an end portion located near said intake passage and said piston rod has an end portion located remote from said intake passage, said spring means comprising a first compression spring interposed between the end portion of said support pipe and one of the opposed end faces of said sleeve and a second compression spring interposed between the end portion of said piston rod and the other opposed end face of said sleeve.

5. A variable venturi-type carburetor according to claim 4, wherein the end portion of said support pipe has a first snap ring mounted thereon for supporting said first compression spring and the end portion of said piston rod has a second snap ring mounted thereon for supporting said second compression spring.

6. A variable venturi-type carburetor according to claim 5, wherein spring retainers, having an L-shaped cross section, are inserted between said first compression spring and said first snap ring and between said second compression spring and said second snap ring, respectively.

7. A variable venturi-type carburetor according to claim 1, wherein each of said ball insertion bores comprises an increased diameter portion at central portion thereof and a reduced diameter portion formed on the inner circumferential wall of said sleeve and having a diameter which is slightly smaller than that of said balls, said increased diameter portion having a diameter which is slightly larger than that of said balls.

8. A variable venturi-type carburetor according to claim 7, wherein said sleeve is made of a synthetic resin and each of said ball insertion bores comprises another reduced diameter portion formed on the outer circumferential wall of said sleeve and having a diameter which is slightly smaller than that of said balls.

9. A variable venturi-type carburetor according to claim 1, wherein said connecting passage comprises a plurality of grooves formed on the outer circumferential wall of said sleeve.

10. A variable venturi-type carburetor according to claim 9, wherein the outer circumferential wall of said sleeve has a uniform diameter over the entire length of said sleeve, each of said grooves extending in the axial direction of said suction piston over the entire length of the outer circumferential wall of said sleeve.

11. A variable venturi-type carburetor according to claim 9, wherein said sleeve has a pair of raised portions formed on the outer circumferential wall of said sleeve near the opposed end faces of said sleeve, respectively, each of said grooves extending in the axial direction of said suction piston over the entire length of the outer circumferential walls of said raised portions.

12. A variable venturi-type carburetor according to claim 1, wherein said connecting passage comprises a plurality of bores extending through said sleeve in the axial direction of said suction piston.

13. A variable venturi-type carburetor according to claim 1, wherein a raised wall is formed on an inner wall of said intake passage opposite to said suction piston, the tip face of said suction piston having an upstream end portion which cooperates with said raised wall to restrict the flow of air into said venturi.

* * * * *